April 25, 1961 J. H. CASLOW 2,981,287
PILOT OPERATED VALVE MECHANISM
Filed Nov. 14, 1958
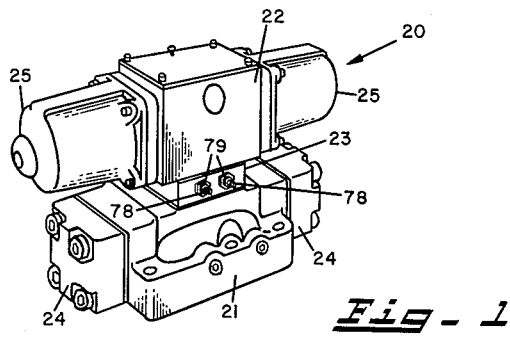
Fig. 1
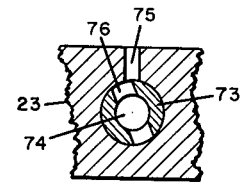
Fig. 3
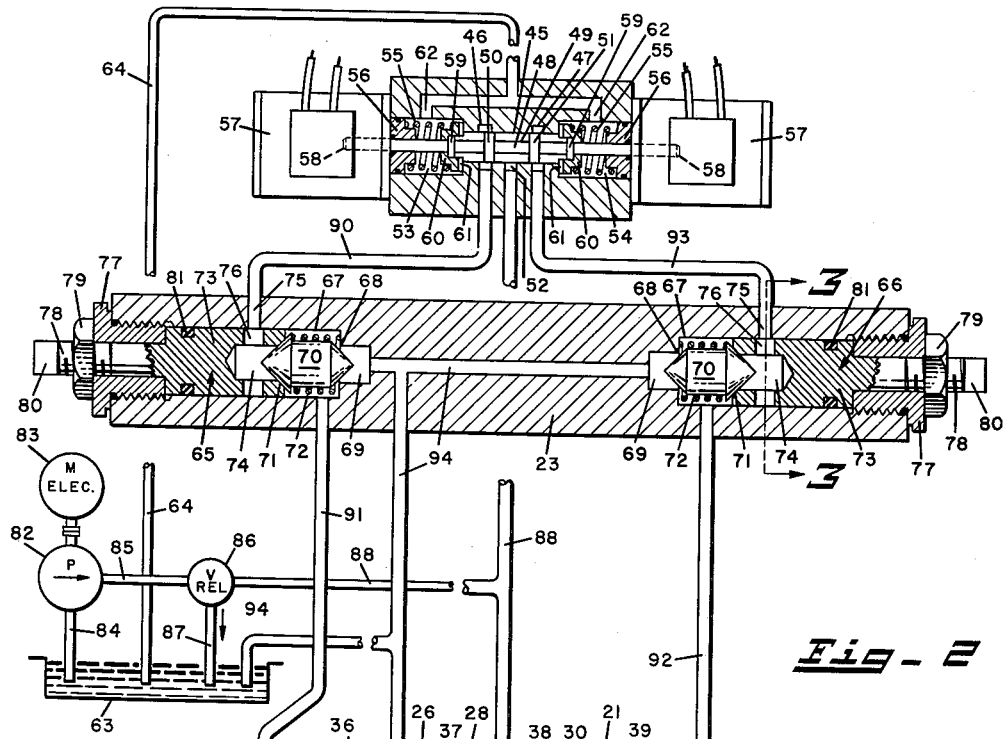
Fig. 2
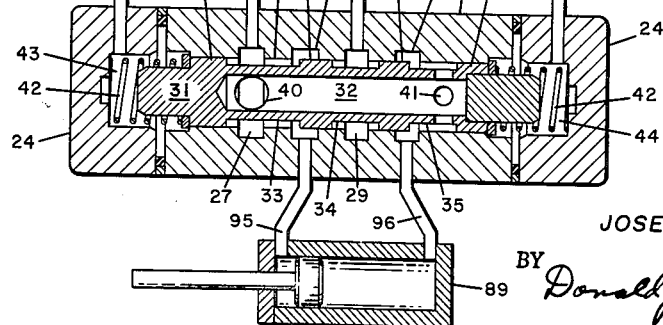
INVENTOR.
JOSEPH H. CASLOW
BY Donald J. Detrich United States Patent Office 2,981,287
Patented Apr. 25, 1961

2,981,287
PILOT OPERATED VALVE MECHANISM

Joseph H. Caslow, Columbus, Ohio, assignor to American Brake Shoe Company, New York, N.Y., a corporation of Delaware Filed Nov. 14, 1958, Ser. No. 774,040

12 Claims. (Cl. 137—622)

This invention relates to valves and more particularly to those types of valves which are known in the art as pilot operated valves.

A pilot operated valve usually includes a main fluid directing or distributing valve the flow or fluid directing condition of which is changed by fluid under pressure which fluid is under the control of a much smaller control or pilot valve. The control or pilot valve usually includes a small flow directing core or spool which is axially movable within a bore and which may be shifted to different positions therein, for example by air pressure, electromagnetic, hydraulic or manually operated means. In theses valves, it is important that the pilot core or spool be freely movable within its bore and, of course, it is also important that fluid be prevented from leaking from the end or ends of the pilot valve bore around the spool operating means which projects therefrom to shifting or operating apparatus such as mentioned above.

In order to prevent loss of fluid at the ends of the pilot valve bore, the bore is usually provided with shaft seal means, but because the pilot valve is usually small and since the spool and operating means must operate therein relatively freely these seals are usually of a delicate nature and are not constructed to withstand high pressures or surges in pressure. As a protective measure, drain conduits or passageways are usually incorporated in the valve mechanism to drain fluid from adjacent the mentioned shaft seals. However, because of the nature and size of the valve structure these drain passageways usually must necessarily be small in cross sectional area and they may be connected to drain lines which are of such length that they may offer resistance to the flow of fluid therethrough and permit or cause pressures to build up adjacent the shaft seals which pressures may tend to or actually damage the shaft seals. This is particularly true in valves wherein the main valve is operated by fluid in a pair of chambers and the fluid from these chambers is exhausted through the pilot valve when the condition of the main valve is changed since in these valves there is always a surge of fluid through the pilot valve from the pressure chamber which is being exhausted and these surges in pressure may reach and damage the seals of the pilot valve.

One of the objects of this invention is to provide a pilot operated valve in which provision is made for preventing pressure surges created when the condition of of the main valve thereof is changed from damaging the shaft seal means of the pilot valve mechanism thereof.

In carrying out the foregoing object, it is another object of the invention to provide in a pilot operated valve mechanism automatically operated valve means for preventing the flow of fluid from the pressure operating means of the main valve to the pilot valve means and for directing such fluid to an exhaust or drain passageway.

It is still another object of the invention to provide a pilot operated valve mechanism including the features set forth in the foregoing objects in which provision is made for throttling the flow of fluid from the pilot valve which is employed to change the condition of the main valve thereof.

In carrying out the foregoing object, it is another object of the invention to provide valve means including elements for in one instance throttling the flow of fluid from the pilot valve and in another instance for preventing fluid from flowing from the pressure operating means for the main valve to the pilot valve and directing said fluid to an exhaust or drain passageway.

It is still another object of the invention to provide valve means contained in a separate body and capable of any or all of the functions set forth in the foregoing objects and which may be made a part of a pilot operated valve by being attached to or between body elements thereof.

Further objects and advantages of the present invention will be apparent from the following description, reference being had to the accompanying drawings wherein a preferred form of embodiment of the invention is clearly shown.

In the accompanying drawings:

Fig. 1 is a view in perspective of a pilot operated valve including the features of the invention;

Fig. 2 is a diagrammatic showing of a hydraulic circuit including the pilot operated valve seen in Fig. 1, the pilot operated valve being separated into sections and shown in diagrammatic form, and Fig. 3 is a view in section, the section being taken on line 3—3 of Fig. 2 and showing features of construction of one of the throttling or speed control valves of the apparatus.

A pilot operated valve mechanism 20 which includes the features of the invention is shown in perspective in Fig. 1 of the drawings. The particular valve mechanism 20 illustrated is adapted to control hydraulic fluid, preferably oil, under high pressure and it is a solenoid operated type pilot operated valve, that is, a valve in which the control or pilot valve is operated by solenoids. It is to be understood that the particular valve 20 illustrated is employed only as an example of a pilot operated valve which includes the features of the invention and that the invention is equally applicable to pilot operated valves which are operated by air pressure, hydraulic or manually operated means and which also may control the flow of other fluids under pressure in different manners.

The valve mechanism 20 illustrated in Fig. 1 of the drawings includes a body comprised of three elements or sections 21, 22 and 23 which are secured together to form the complete body of the valve mechanism 20. Of these three body elements 21, 22 and 23, the element 21 forms that section of the complete valve body which contains the main valve mechanism of the apparatus, the element 22 forms that section of the complete valve body which contains the pilot valve mechanism of the apparatus, and the section 23 forms a section of the complete valve body which is secured between the elements 21 and 22 and contains the throttling or speed control valves as well as the flow directing check valves of the complete valve mechanism 20 which will be described in detail hereinafter in connection with Figs. 2 and 3 of the drawings. The body section 21 is provided with a pair of identical end caps 24 which close the opposite ends of a main bore therein and which cooperate in forming pressure chambers for operating the main valve of the valve apparatus 20 and the section 22 carries a pair of cover elements 25 each of which covers or houses a solenoid for operating the pilot valve mechanism of the apparatus.

For ease in understanding the construction and operation of the pilot operated valve mechanism 20 the valve body elements 21, 22 and 23 thereof are separated in Fig. 2 of the drawings and the structures which are attached to and/or contained or housed within the body elements or sections 21 and 22 are shown diagrammatically while the elements which are housed within the body section 23 are shown as they are actually constructed except that they are shown in end to end relation rather than in side by side relation as indicated in Fig. 1 of the drawings. Also, in Fig. 2 of the drawings the valve mechanism 20 is shown in a diagrammatically illustrated hydraulic circuit of a kind wherein valves of its general type are frequently employed.

Referring now to the construction of the complete pilot operated valve mechanism 20 and with particular reference to Fig. 2 of the drawings, the body section 21 includes a bore 26 which extends through the body and which is closed at its opposite ends by the end caps 24. This bore 26 is provided with annular grooves or ports 27, 28, 29 and 30 which are spaced along its length and it contains a main valve core or spool 31 which fits closely within it and is axially movable to different flow directing positions therein.

The main core or spool 31 is constructed of two pieces whereby its interior forms a chamber 32 and its outer surface is provided with three spaced circumferential grooves 33, 34 and 35 and four circumferential lands 36, 37, 38 and 39. Drilled openings 40 and 41 connect the chamber 32 with the grooves 33 and 35, respectively. The ends of the main core or spool 31 are reduced in diameter to form guides for a pair of identical springs 42 which abut the end caps within chambers or recesses 43 and 44 formed therein and washers which abut the end lands 36 and 39 of the core or spool 31 and which, in turn, abut shoulders at the ends of the bore 26.

The structure of the main valve above described is typical of that of a spring centered, open center four-way valve and since this construction is well known in the art, it need not be described herein in further detail.

The body section 22 of the complete pilot operated valve mechanism 20 includes a pilot valve bore 45 which is provided with a pair of spaced annular grooves or ports 46 and 47 and this bore 45 receives a pilot valve core or spool 48 which is provided with a central groove 49 flanked by a pair of lands 50 and 51. The pilot valve core or spool 48 fits snugly but freely slidably within the bore 45 and when it is in its center or neutral position shown in the drawings its lands 50 and 51 isolate the grooves or ports 46 and 47 from each other and the central groove 49 in spool 48 which is in communication at all times with a fluid pressure inlet port 52 which opens into the bore 45 between the ports or grooves 46 and 47.

The ends of the bore 45 are enlarged to provide a pair of chambers 53 and 54 each of which receives a spring 55 and a shaft seal 56. Springs 55 and seals 56 are held in the end of a chamber 53 or 54 by the frame of a solenoid operator 57. The pilot valve core or spool 48 is also provided at its ends with operating shafts 58 which extend through the chambers 53, 54 and shaft seals 56 to the armatures of the solenoid operators 57. Upon each of the shafts 58 there is a shoulder element 59 which is abutted by a disk 60. Disks 60 are normally held against abutments formed at each end of the pilot bore 45 by the springs 55 whereby the pilot core or spool 48 is held in its central or neutral position as shown. Each of the disks 60 is provided with a plurality of grooves or slots 61 by which communication between the pilot valve bore 45 and the chambers 53 and 54 is obtained. Chambers 53 and 54 are each provided with a drain port 62 which is connected to a tank or reservoir 63 through a drain conduit 64.

The body section 23 houses two identical combination double acting check and throttle valve structures 65 and 66 each of which includes a bore 67 formed in the body section 23. These bores are stepped to provide valve seats 68 adjacent exhaust ports 69 upon which double acting poppet type check valve elements 70 seat. Each of the valve elements 70 is urged away from its seat 68 toward a second seat 71 by a light compression spring 72 which abuts a shoulder on the valve element 70 and a shoulder in the bore 67 adjacent the seat 68. The valve seats 71 are each formed by an end of a valve plug 73 which is telescoped into the bore 67 and is rotatable therein. The valve plug 73 is centrally recessed adjacent the seat 71 to provide a fluid inlet port 74 and fluid enters this port or recess through an adjustable orifice or throttle valve formed by an inlet port or passageway 75 in the body section 23 and a port 76 formed in the plug 73. Plug 73 is retained in the bore 67 by a bushing 77 which abuts a shoulder on the plug 73 and surrounds a stem 78 thereof. The end of stem 78 is threaded to receive a lock nut 79 and it is flatted at 80 on opposite sides to receive a tool, such as a wrench, whereby it may be adjustably rotated when the lock nut 79 is loosened to adjust the adjustable orifice or throttling valve formed by the ports 75 and 76. An O-ring 81 on plug 73 is employed to prevent the loss of fluid from the bore 67 along the plug 73.

The operation of the complete pilot operated valve mechanism 20 and the elements thereof are easily understood from the following description of the exemplary hydraulic circuit in which it is shown. The circuit includes a hydraulic pump 82 driven by an electric motor 83. Pump 82 receives fluid from tank or reservoir 63 through a conduit 84 and discharges this fluid under pressure through a conduit 85 to a relief valve 86 the low pressure or exhaust port of which is connected to the tank or reservoir 63 by a conduit 87. It will be seen that the reservoir, pump and relief valve form a source of fluid under pressure from which fluid is supplied from the high pressure outlet port of relief valve 86 to a conduit or passageway 88 which in practice is formed by the body sections 21, 22 and 23. The conduit or passageway 88 forms the main fluid pressure receiving conduit of the valve mechanism 20 and it is connected to the inlet port 29 of the main valve and to the inlet port 52 of the control or pilot valve. When neither of the solenoid operators 57 is energized, the core or spool 48 of the pilot valve is held in its central or neutral position by the springs 55 and disks 60 and the port 52 is closed to prevent the flow of fluid through the pilot valve. When the core or spool 48 is in this center position, as shown in Fig. 2, the main valve spool 31 will also be in its spring centered or neutral position in which it blocks the port 29. Under these conditions, the entire output volume of pump 82 flows through the relief valve 86 and conduit 87 to tank 63.

Assuming now that it is desired to cause a motor 89 connected in the hydraulic circuit to extend its ram, one of the solenoid operators 57 is energized to move the pilot core or spool 48 to the left from its central or neutral position shown in Fig. 2 to a position in which it establishes connection or communication between the pressure inlet port 52 and the port 46. When this occurs, fluid under pressure flows from the port 46 through a conduit 90 through the left hand throttle or speed control valve formed by the ports 75 and 76 to the recess inlet port 74 in plug 73 and this fluid forces the poppet 70 to open the valve 70—71 and to close the valve 70—68 and to enter the bore 67. Bore 67 is connected by a conduit 91 with the pressure chamber 43 in the body section 21 and cap 24 and pressure supplied to this chamber through the conduit 91 acts upon the end of the main valve core or spool 31 therein to force the core or spool 31 from its central or neutral position shown to a position at the right thereof.

When the main core or spool 31 is shifted to the right from its central or neutral position, it causes the displacement of fluid from the pressure chamber 44 and this fluid is conducted through a conduit 92 to the right hand check valve in body section 23. Because the poppet 70 of the right hand check valve is urged against the seat 71 by its spring 72 this fluid which is discharged from the pressure chamber 44 can not reach the pilot valve and its shaft seal through the conduit or passageway 93 by which the check valve is connected with the pilot valve and it flows or passes through the check valve 70—68 into the discharge or exhaust port 69 and through a discharger or exhaust conduit 94 to the tank or reservoir 63.

When the main valve core or spool is shifted to its right hand position above described, it directs fluid under pressure from the conduit 88 and port 29 to port 30 through a conduit 96 to the piston end of the reversible motor 89 to urge the piston thereof to the left. It will, of course, be seen that the main valve spool 31, when moved to the right as described, also opens a flow path for fluid discharged from the piston rod end of the motor which path is through a conduit or passageway 95, port 28, groove 33 in spool or core 31, the port 27 and through conduit 94 to the tank or reservoir 63.

When the main valve core or spool 31 is to be shifted to a position which is to the left of that shown in the drawings, the other solenoid operator 57 is energized to shift the pilot valve core or spool 48 to the left of its central or neutral position shown and the system is operated in a manner which is the reverse of that above described except that the fluid exhausted from the piston end of the motor 89 flows through conduit 96, ports 30 and 41, the hollow interior 32 of spool or core 31, the ports 40 and 27 and through conduit 94 to tank or reservoir 63.

As is well understood in the art, when the position of the main valve core or spool 31 is shifted in either direction it necessarily displaces fluid from one or the other of the pressure chambers 43 or 44 and since the core or spool is moved quickly it displaces fluid from the chambers 43 and 44 are such a rate as to create pressure surges in the exhaust passages leading therefrom. In prior art structures of the type referred to these exhaust passages were through the pilot valve to the seals thereof and from adjacent these seals through drain passageways such as the drain conduit 64 above described. In the valve structure herein described these pressure surges are prevented by the check valves 70—71 from entering the conduits 90 and 93 and they are directed by the double acting check valves through the separate exhaust passageway or conduit 94 and thus the shaft seals 56 of the pilot valve are positively protected from damage from these surges.

In practice it frequently occurs that other hydraulic apparatuses which may create fluid surges are connected to drain to the tank 63 through the exhaust conduit 94 or branches or extensions thereof and the check valves 70—71 also protect the seals of the pilot valve from such surges or pressures which may build up in the conduit 94 for any reason. The drain conduit 64 is retained to drain fluid which may seep into the chambers 53 and 54 adjacent the shaft seals 56 whereby the pilot valve core or spool 48 may operate freely and will not compress liquid upon or against the shaft seals.

The adjustable orifice, throttle or speed control valves 75, 76 are employed to adjust or predetermine the rate at which fluid may be supplied to the pressure chambers 43 and 44 thereby to control or predetermine the speeds at which the positions of the main pilot core or spool will be changed.

While the complete valve apparatus 20 may be formed to include a body formed of a single element, it is preferred that it be formed of a plurality of pieces or sections whereby the section 23 and its valving may be included in it when the valve is to be employed under conditions wherein there is danger that pressures or pressure surges may damage the pilot valve seals and wherein this structure may be deleted when the valve mechanism 20 is employed in a system wherein such conditions will not exist, i.e., for example when the valve mechanism 20 is positioned adjacent the tank or reservoir and is connected therewith through short drain conduits of large capacity.

While the form of embodiment of the present invention as herein disclosed constitutes a preferred form, it is to be understood that other forms might be adopted, all coming within the scope of the claims which follow:

I claim:

1. Pilot operated valve mechanism including means forming a main valve; a pressure chamber; means in said pressure chamber operative in response to pressure therein for changing the condition of said main valve; a pilot valve for admitting pressure to said pressure chamber, said pilot valve including seal means; passageway forming means connecting said pilot valve and said pressure chamber; an exhaust conduit means, and pressure responsive valve means connecting said passageway forming means and said exhaust conduit means, said pressure responsive valve means being connected and arranged to check the flow of fluid from said pressure chamber and said exhaust conduit means to said pilot valve and the seal means thereof and from said pilot valve to said exhaust conduit means.

2. Pilot operated valve mechanism including means forming a main valve; resilient means operative to retain said main valve in one condition; a pressure chamber; means in said pressure chamber operative in response to pressure therein for changing the condition of said main valve; a pilot valve for admitting pressure to said pressure chamber, said pilot valve including seal means; passageway forming means connecting said pilot valve and said pressure chamber; an exhaust conduit means, and pressure responsive valve means connecting said passageway forming means and said exhaust conduit means, said pressure responsive valve means being connected and arranged to check the flow of fluid from said pressure chamber and said exhaust conduit means to said pilot valve and the seal means thereof and from said pilot valve to said exhaust conduit means.

3. Pilot operated valve mechanism including means forming a main valve; a pressure chamber; means in said pressure chamber operative in response to pressure therein for changing the condition of said main valve; a pilot valve for admitting pressure to said pressure chamber, said pilot valve including seal means; passageway forming means connecting said pilot valve and said pressure chamber; an exhaust conduit means, and double acting check valve means connecting said passageway forming means and said exhaust conduit means, said check valve means being constructed and arranged normally to check the flow of fluid from said chamber and exhaust conduit to said pilot valve and the seal means thereof and being operated by fluid pressure to check the flow of fluid from said pilot valve to said exhaust conduit.

4. Pilot operated valve mechanism including means forming a main valve; a pressure chamber; means in said pressure chamber operative in response to pressure therein for changing the condition of said main valve; a pilot valve for admitting pressure to said pressure chamber, said pilot valve including seal means; passageway forming means connecting said pilot valve and said pressure chamber; an exhaust conduit means; double acting check valve means connecting said passageway forming means and said exhaust conduit means, said check valve means being constructed and arranged normally to check the flow of fluid from said chamber and exhaust conduit to said pilot valve and the seal means thereof and being operated by fluid pressure to check the flow of fluid from said pilot valve to said exhaust conduit, and an adjustable throttle means in said passageway forming means between said pilot valve and said double acting check valve.

5. Pilot operated valve mechanism including means forming a main valve; a pressure chamber; means in said pressure chamber operative in response to pressure therein for changing the condition of said main valve; a pilot valve for admitting pressure to said pressure chamber, said pilot valve including seal means; passageway forming means connecting said pilot valve and said pressure chamber; an exhaust conduit means, and a combination double acting check valve and adjustable throttle means in said passageway forming means connecting said passageway forming means and said exhaust conduit means, said throttle being between said check and pilot valve, said check valve means being constructed and arranged normally to check the flow of fluid from said chamber and exhaust conduit to said pilot valve and the seal means thereof and being operated by fluid pressure to check the flow of fluid from said pilot valve to said exhaust conduit.

6. In pilot operated valve mechanism, means forming a body having a bore therein; a main valve spool in said bore; means forming a pair of pressure chambers, one at each end of said main spool; pilot valve means for selectively directing fluid under pressure to said pressure chambers for moving said main spool, said pilot valve means including a bore; a pilot valve spool in said pilot bore; seal means at the ends of said pilot spool; a pair of passageway forming means, one connecting each of said pressure chambers with said pilot valve bore; an exhaust conduit means; valve means connecting each of said passageway forming means and exhaust conduit means, said valve means being connected and arranged to check the flow of fluid from said pressure chambers and exhaust conduit means to said pilot bore and from said pilot bore to said exhaust conduit means.

7. In pilot operated valve mechanism, means forming a body having a bore therein; a main valve spool in said bore; means forming a pair of pressure chambers, one at each end of said main spool; pilot valve means for selectively directing fluid under pressure to said pressure chambers for moving said main spool, said pilot valve means including a bore; a pilot valve spool in said pilot bore; seal means at the ends of said pilot spool; a pair of passageway forming means, one connecting each of said pressure chambers with said pilot valve bore; an exhaust conduit means; double acting check valve means connecting each of said passageway forming means and exhaust conduit means, said double acting check valve means being connected and arranged to check the flow of fluid from said pressure chambers and exhaust conduit means to said pilot bore and from said pilot bore to said exhaust conduit means.

8. In pilot operated valve mechanism, means forming a first body having a distributing valve bore therein; a distributing valve spool in said bore; means forming a pair of pressure chambers one at each end of said spool; means in each of said pressure chambers responsive to pressure therein for moving said spool in said bore; means forming a second body having a pilot valve bore therein; a pilot valve spool in said pilot valve bore, said pilot valve functioning to direct fluid under pressure selectively to said pressure chambers for moving said spool as aforesaid; seal means adjacent the opposite ends of said pilot valve spool; means forming a third body adapted to be secured between said first and second bodies; two conduit means formed in said bodies each connecting said pilot bore and one of said pressure chambers; a pair of double acting check valves within said third body, one in each of said conduit means; exhaust conduit means connected with each of said check valves, said check valves being constructed and arranged normally to check the flow of fluid from said chambers and exhaust conduit means to said pilot valve and the seal means thereof and being operated by pressure from said pilot valve to check the flow of fluid from the latter to said exhaust conduit means.

9. In pilot operated valve mechanism, means forming a first body having a distributing valve bore therein; a distributing valve spool in said bore; means forming a pair of pressure chambers one at each end of said spool; means in each of said pressure chambers responsive to pressure therein for moving said spool in said bore; means forming a second body having a pilot valve bore therein; a pilot valve spool in said pilot valve bore, said pilot valve functioning to direct fluid under pressure selectively to said pressure chambers for moving said spool as aforesaid; seal means adjacent the opposite ends of said pilot valve spool; means forming a third body adapted to be secured between said first and second bodies; two conduit means formed in said bodies each connecting said pilot bore and one of said pressure chambers; a pair of double acting check valves within said third body, one in each of said conduit means; an adjustable throttle means within said third body in each of said two conduit means and between said check valves and said pilot valve; exhaust conduit means connected with each of said check valves, said check valves being constructed and arranged normally to check the flow of fluid from said chambers and exhaust conduit means to said pilot valve and the seal means thereof and being operated by pressure from said pilot valve to check the flow of fluid from the latter to said exhaust conduit means.

10. In pilot operated valve mechanism, means forming a first body having a distributing valve bore therein; a distributing valve spool in said bore; means forming a pair of pressure chambers one at each end of said spool; means in each of said pressure chambers responsive to pressure therein for moving said spool in said bore; means forming a second body having a pilot valve bore therein; a pilot valve spool in said pilot valve bore, said pilot valve functioning to direct fluid under pressure selectively to said pressure chambers for moving said spool as aforesaid; seal means adjacent the opposite ends of said pilot valve spool; means forming a third body adapted to be secured between said first and second bodies; two conduit means formed in said bodies each connecting said pilot bore and one of said pressure chambers; a pair of combination double acting check valve and throttle means within said third body, one in each of said conduit means; exhaust conduit means connected with each of said check valves, said check valves being constructed and arranged normally to check the flow of fluid from said chambers and exhaust conduit means to said pilot valve and the seal means thereof and being operated by pressure from said pilot valve to check the flow of fluid from the latter to said exhaust conduit means.

11. Valve means for use in a pilot operated valve assembly, said valve means including a body having a bore therein; an inlet and a pair of outlet passageways in said body connected at spaced points with said bore; fluid pressure operated double acting valve means in said bore constructed and arranged to check the flow of fluid from said outlet passageways to said inlet passageway and to check the flow of fluid from said inlet passageway to one of said outlet passageways, and throttle means between said inlet passageway and said last mention outlet passageway.

12. Valve means for use in a pilot operated valve assembly, said valve means including a body having a bore therein; an inlet and a pair of outlet passageways in said body connected at spaced points with said bore, and a combination double acting fluid pressure operated check valve and a throttle means in said bore constructed and arranged to check the flow of fluid from said outlet passageways to said inlet passageway, to check the flow of fluid from said inlet passageway to one of said outlet passageways, and to throttle the flow of fluid from said inlet passageway to said last mentioned outlet passageway.

References Cited in the file of this patent

UNITED STATES PATENTS

| | | |
|---|---|---|
| 2,287,709 | Ringman | June 23, 1942 |
| 2,732,860 | Ray | Jan. 31, 1956 |
| 2,803,266 | Towler et al. | Aug. 20, 1957 |
| 2,812,055 | Wenger | Nov. 5, 1957 |